Nov. 10, 1936.  G. M. BARNES ET AL  2,060,015
SUSPENSION FOR VEHICLES
Filed Jan. 24, 1934
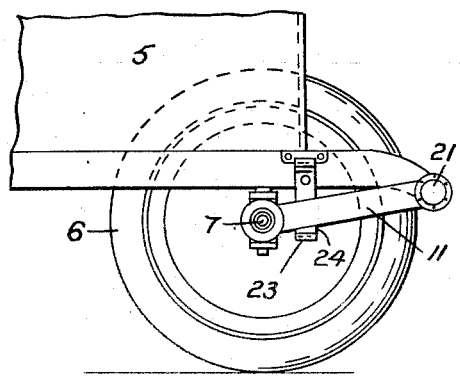
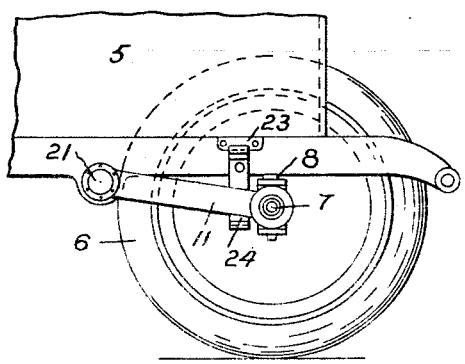
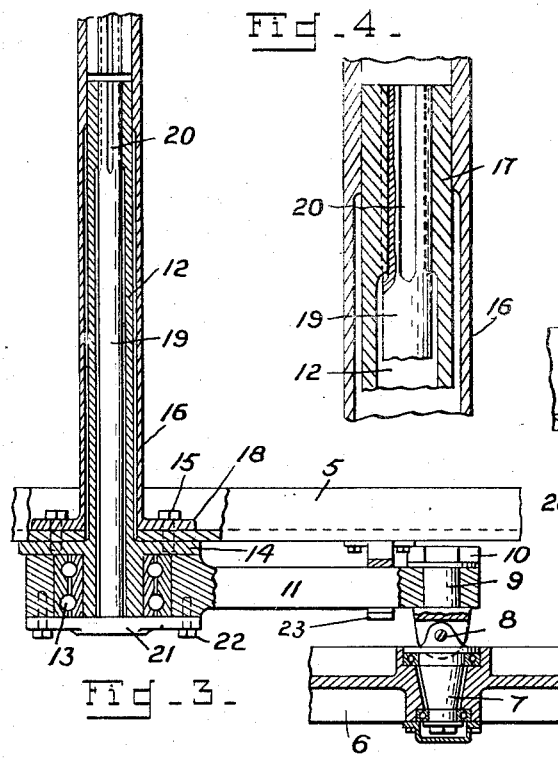
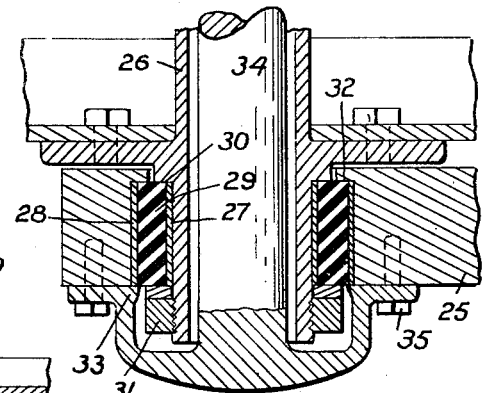
Inventors
Gladeon M. Barnes
Warren E. Preston
By W. N. Roach
Attorney Patented Nov. 10, 1936

2,060,015

UNITED STATES PATENT OFFICE 2,060,015

SUSPENSION FOR VEHICLES

Gladeon M. Barnes, Hastings, Mich., and Warren E. Preston, Aberdeen, Md.

Application January 24, 1934, Serial No. 708,138

2 Claims. (Cl. 267—57)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to a suspension for vehicles.

The principal object of the invention is to provide a simple, inexpensive wheel mounting which has considerable flexibility without the employment of springs.

Specifically the invention resides in placing a wheel on the outer end of a crank arm which is rigidly secured to a torque shaft disposed transversely of the vehicle body and attached thereto. Movement of the crank arm is permitted by torsional action of the transverse shaft within its elastic limit.

The invention also includes a novel method of conveniently and compactly arranging the torque shaft to reduce its overall length.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawing, wherein:

Fig. 1 is a view in right side elevation of a vehicle with the near wheel removed and showing the improved wheel mounting.

Fig. 2 is a similar view showing an alternate arrangement.

Fig. 3 is a longitudinal sectional view of the wheel mounting.

Fig. 4 is a detail sectional view of the splined connection between elements of the torque shaft, and Fig. 5 is a sectional view of a modification of the crank arm bearing.

Referring to Figs. 1 to 4 there is shown a load member 5 such as a vehicle body which is to be mounted on a plurality of mobile supporting units such as wheels, one of the wheels being shown at 6. In the illustration the wheel 6 is a steering wheel and is mounted on a spindle 7 which is attached through a king pin 8 to a stub axle 9 rigidly secured as by the nut 10 on the outer or free end of a crank arm 11.

The crank arm 11 is rotatably mounted on the outer end of a sleeve 12 through an anti-friction bearing 13 and extends either rearwardly or forwardly with respect thereto as seen in Figs. 1 and 2. The sleeve 12 is disposed transversely of the body 5 and has a flange 14 whereby it is rigidly secured to the body by means of bolts 15. The sleeves 12—12 of opposite wheels are housed in a tube 16 having a centrally located bearing 17 for supporting the adjacent inner ends of the sleeves. The tube 16 is formed with a flange 18 on each end whereby it is secured to the body 5 by the bolts 15.

A shaft 19, either solid or hollow, is disposed within the sleeve 12 and is connected to the inner portion of the sleeve by splines 20. The outer end of the shaft 19 is formed with a flange 21 which is secured by bolts 22 to the hub of the crank arm 11. The shaft 19 is preferably peripherally spaced from the sleeve 12 throughout the greater portion of its length by virtue of the bearing through the splines 20 and the antifriction bearing 13.

The body 5 carries a pair of spaced stop members 23—23 for limiting movement of the crank arm 11. A resilient block or pad 24 is preferably carried by each stop member 23.

In the modification shown in Fig. 5 the bearing for mounting the crank arm 25 on the sleeve 26 consists of a pair of spaced bushings 27 and 28 between which is a ring of rubber 29 which is preferably vulcanized to the bushings. The inner bushing 27 is held against a shoulder 30 of the sleeve 26 by means of a nut 31 threaded on the outer end of the sleeve and is held against rotation relative to the sleeve.

The outer bushing 28 is held against a shoulder 32 of the crank arm 25 by means of a flange 33 formed on a shaft 34 and secured to the crank arm by bolts 35. The bushings 27 and 28 can be displaced 60 degrees with respect to one another without damaging the rubber ring 29.

Referring to Figs. 1-3 the rigidly connected crank arm 11, shaft 19 and sleeve 12 being attached to the body 5 by means of the bolts 15 support the body and under normal conditions of operation the crank arm does not move angularly relative to the body. The crank arm can only move through torsional action of the shaft and sleeve.

Inasmuch as the body 5 has an appreciable weight the shaft and sleeve are so determined that the normal torsional action due to this weight is about 7°. When the wheel 6 of the body 5 encounters an obstruction or irregularity in the road the torsional action continues or increases in order to permit the crank arm 11 to rotate about its pivot. As an example a crank arm ten inches in length will provide a four inch vertical movement of the wheel with a torsional action in the shaft and sleeve of about 23°.

The amount of twist of the shaft 19 and sleeve 12 is found from the formula:

$$\phi = \frac{584 Q e}{F d^4}$$

Where $\phi$=angle of twist in degrees
Q=the torque in inch pounds
e=length of the shaft
F=12,000,000—the modules of elasticity of steel
d=diameter of the shaft.

The stress in the shaft 19 and sleeve 5 is found by solving for S in the formula.

$$d = 1.721 \sqrt{\frac{Q}{S}}$$

Where S=fiber stress in pounds per square inch. For a hollow sleeve such as 12 the following formula is used:

$$Q = \frac{\pi}{16} \frac{(D^4 - d^4)}{D} S$$

By employing a steel of an appropriate elastic limit that is not exceeded by the maximum allowed angle of twist, the shaft and sleeve will always return to their original state.

It will be noted from the first formula that the angle of twist of a shaft is directly proportional to the length of the shaft. By using the shaft 19 alone the mount of twist which it would be possible to obtain would not permit the crank arm to rotate through a sufficient angle to give satisfactory road performance. The effective length of the shaft 19 is therefore increased by the sleeve 12 and a convenient and compact arrangement is obtained. The total length of the torque member may thus be divided among any number of connected concentric shafts or sleeves.

The outer sleeve or sleeves should have the same resistance to torsion as the inner shaft 19. Assuming $d$=diameter of shaft 19
$D$=diameter of outer sleeve 12
$d_1$=inside diameter of outer sleeve 12 then in order that both shafts have equal torsional strength the diameter of the sleeve 12 is calculated from the following equation.

$$\frac{\pi}{16} d^3 s = \frac{\pi}{16} \frac{(D^4 - d_1^4)}{D} S$$

$$d_1^4 + D d^3 - D^4 = 0$$

From the foregoing it will be seen that a simple and inexpensive wheel mounting is provided for yieldingly supporting a load member.

We claim:

1. A suspension for vehicles embodying a load member, a tube extending transversely of the load member and having its ends secured thereto, a bearing on the interior of the tube, a sleeve within the tube with its inner end supported in the bearing and secured adjacent its outer end to the load member, a shaft within the sleeve with its inner end splined to the inner end of the sleeve, and a crank arm journaled on the sleeve and secured to the outer end of the shaft.

2. A suspension for vehicles embodying a load member, a tube extending transversely of the load member and having its ends secured thereto, a bearing on the interior of the tube, a sleeve within the tube with its inner end supported in the bearing and secured adjacent its outer end to the load member, said sleeve extending laterally beyond the load member, a crank arm journaled on the extending end of the sleeve, a shaft within the sleeve, the inner end of the shaft splined to the inner end of the sleeve, and a flange on the outer end of the shaft and secured to the crank arm.

GLADEON M. BARNES.
WARREN E. PRESTON.